(12) United States Patent
Kim et al.

(10) Patent No.: US 10,305,098 B2
(45) Date of Patent: May 28, 2019

(54) NEGATIVE ACTIVE MATERIAL FOR SODIUM SECONDARY BATTERY, METHOD FOR PREPARING THEREOF AND SODIUM SECONDARY BATTERY USING THE SAME

(71) Applicant: University-Industry Foundation, Yonsei University, Seoul (KR)

(72) Inventors: Kwang Bum Kim, Gyeonggi-do (KR); Ha Kyung Roh, Jeollabuk-do (KR); Hyun Kyung Kim, Chungcheongbuk-do (KR); Myeong Seong Kim, Seoul (KR)

(73) Assignee: University-Industry Foundation, Yonsei University, Seoul (KR)

( * ) Notice: Subject to any disclaimer, the term of this patent is extended or adjusted under 35 U.S.C. 154(b) by 170 days.

(21) Appl. No.: 15/297,216

(22) Filed: Oct. 19, 2016

(65) Prior Publication Data
US 2017/0155130 A1    Jun. 1, 2017

(30) Foreign Application Priority Data
Dec. 1, 2015    (KR) .................. 10-2015-0169947

(51) Int. Cl.
| | |
|---|---|
| *H01M 4/36* | (2006.01) |
| *H01M 4/66* | (2006.01) |
| *H01M 4/587* | (2010.01) |
| *H01M 4/58* | (2010.01) |
| *H01M 4/04* | (2006.01) |
| *H01M 10/054* | (2010.01) |
| *C01B 32/184* | (2017.01) |
| *C01B 25/45* | (2006.01) |

(52) U.S. Cl.
CPC .......... *H01M 4/366* (2013.01); *C01B 32/184* (2017.08); *H01M 4/0471* (2013.01); *H01M 4/587* (2013.01); *H01M 4/5825* (2013.01); *H01M 10/054* (2013.01); *C01B 25/45* (2013.01)

(58) Field of Classification Search
CPC .... C01B 25/45; C01B 32/184; H01M 10/054; H01M 4/0471; H01M 4/366; H01M 4/5825; H01M 4/587
See application file for complete search history.

(56) References Cited

FOREIGN PATENT DOCUMENTS

| KR | 1020140073720 A | 6/2014 |
| KR | 1020150099959 A | 9/2015 |

OTHER PUBLICATIONS

Y. H. Jung, C. H. Lim, D. K. Kim. Graphene-supported Na3V2(PO4)3 as a high rate cathode material for sodium-ion batteries, J. Mater. Chem. A, 2013, 1, 11350.*
G. Pang, C. Yuan, P. Nie, B. Ding, J. Zhu, X. Zhang. Synthesis of NASICON-type structured NaTi2(PO4)3-graphene nanocomposite as an anode for aqueous rechargeable Na-ion batteries, Nanoscale, 2014, 6, 6328.*
C. Wu, P. Kopold, Y.-L. Ding, P. A. van Aken, J. Maier, Y. Yu. Synthesizing Porous NaTi2(PO4)3 Nanoparticles Embedded in 3D Graphene Networks for High-Rate and Long Cycle-Life Sodium Electrodes, ACS Nano, 2015, 9(6), 6610-6618.*
H.-K. Roh, H.-K. Kim, M.-S. Kim, D.-H. Kim, K. Y. Chung, K. C. Roh, K.-B. Kim. In situ synthesis of chemically bonded NaTi2(PO4)3/rGO 2D nanocomposite for high-rate sodium-ion batteries, Nano Research 2016, 9(6), 1844-1855.*
Xiaona Li et al., "Graphene-Supported NaTi2(PO4)3 as a High Rate Anode Material for Aqueous Sodium Ion Batteries," Journal of the Electrochemical Society, 161 (6), A1181-A1187 (2014).
66th Annual Meeting of the International Society of Electrochemistry—Green Electrochemistry for Tomorrow's Society, Oct. 4-9, 2015, Taipei, Taiwan.
Ha-Kyung Roh et al., "Synthesis and Electrochemical Characterization of NaTi2(PO4)3/Reduced Graphene Oxide Composite for Sodium-ion Battery Application," Presentation at 66th Annual Meeting of the International Society of Electrochemistry, Yonsei University (Korea), (Oct. 9, 2015).

* cited by examiner

*Primary Examiner* — Carlos Barcena
(74) *Attorney, Agent, or Firm* — Hammer & Associates, P.C.

(57) ABSTRACT

Sodium negative active material may have a metal phosphate having a uniform size distribution structures to graphene surface. The negative active material is a metal or a metal oxide precursor in a graphite dispersion solution; And the addition of phosphate, and then applying a microwave, can be produced by heat treatment.

3 Claims, 5 Drawing Sheets

[Fig. 1]
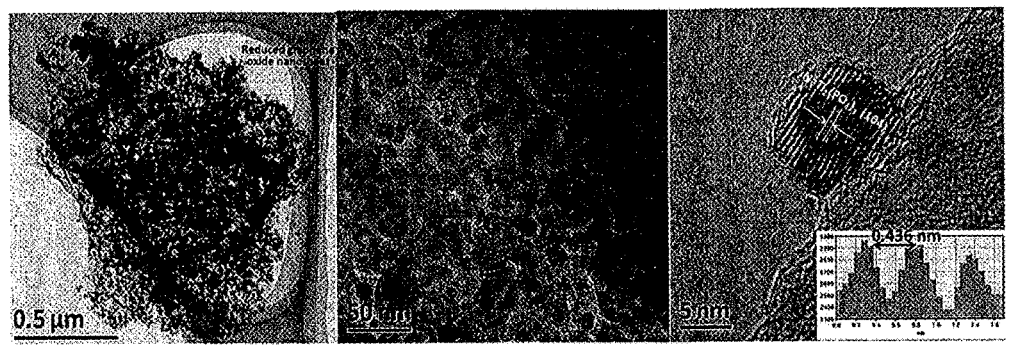
[Fig. 2]
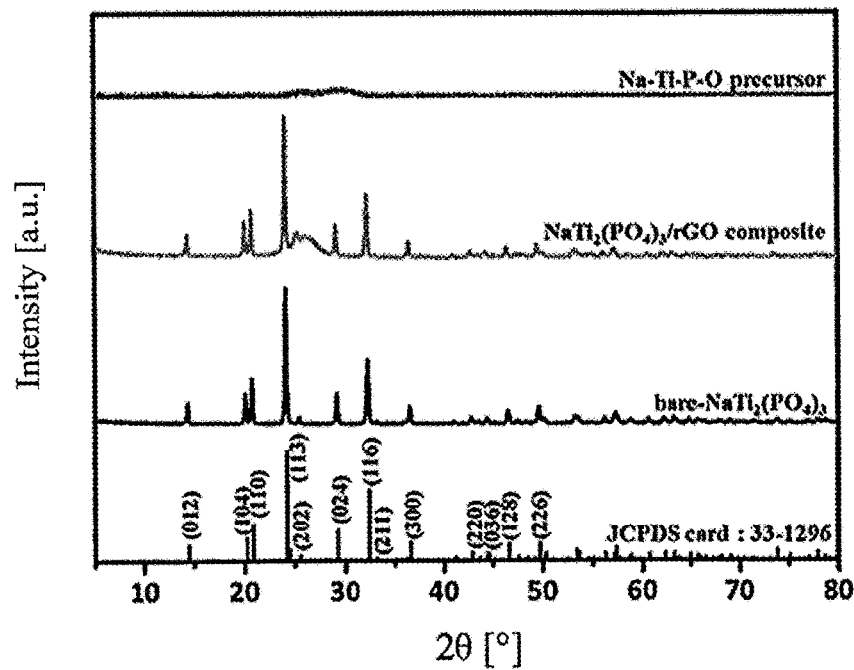

[Fig. 3]
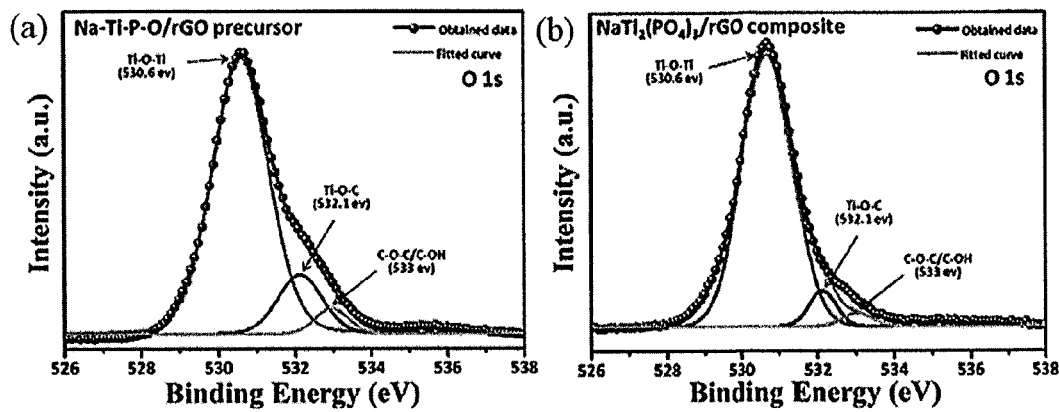
[Fig. 4]
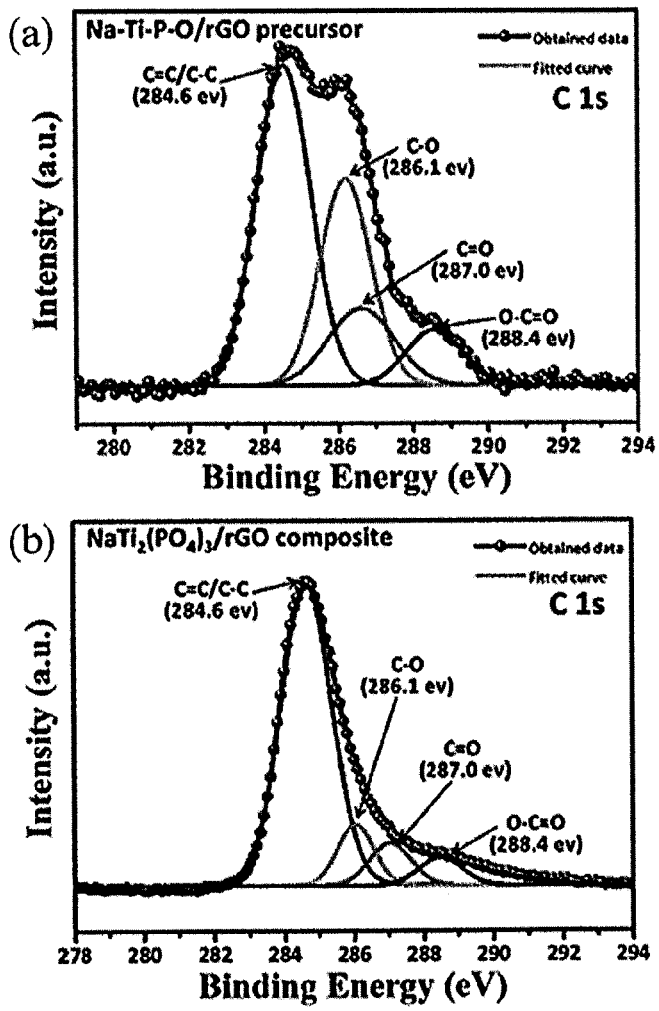

[Fig. 5]
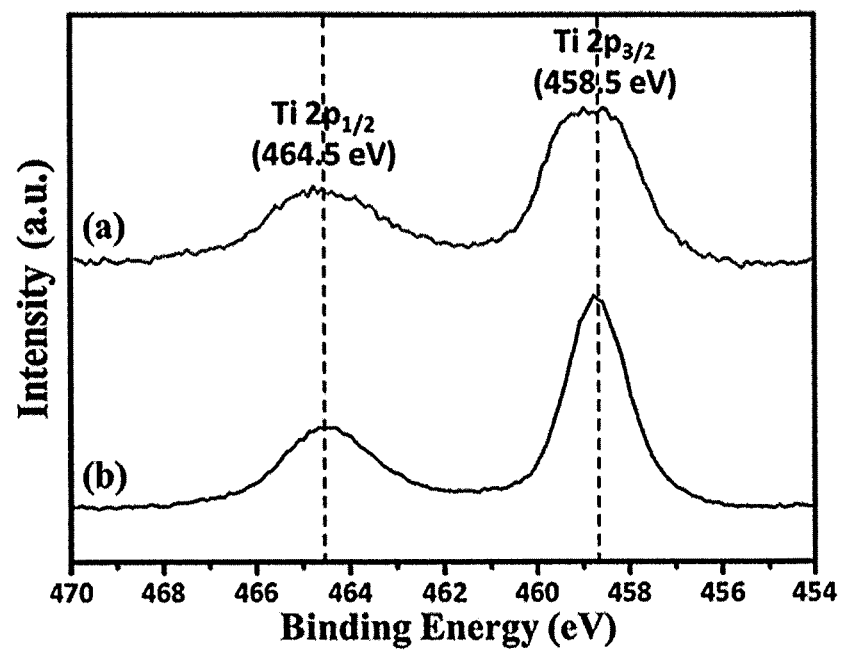

[Fig. 6]
(a)
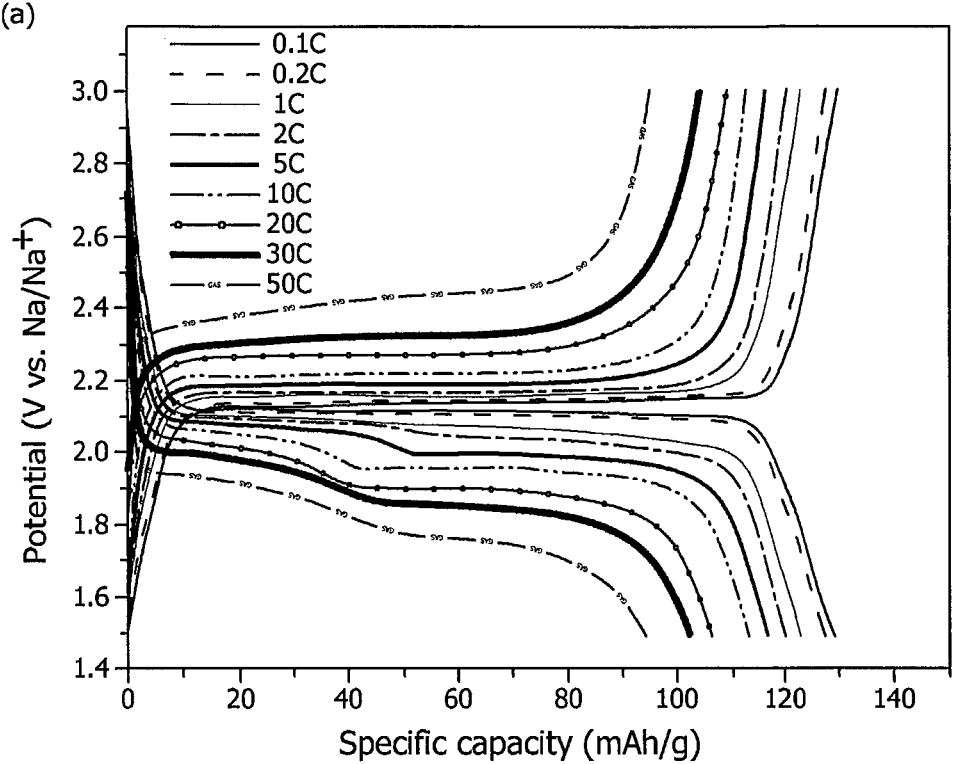
(b)
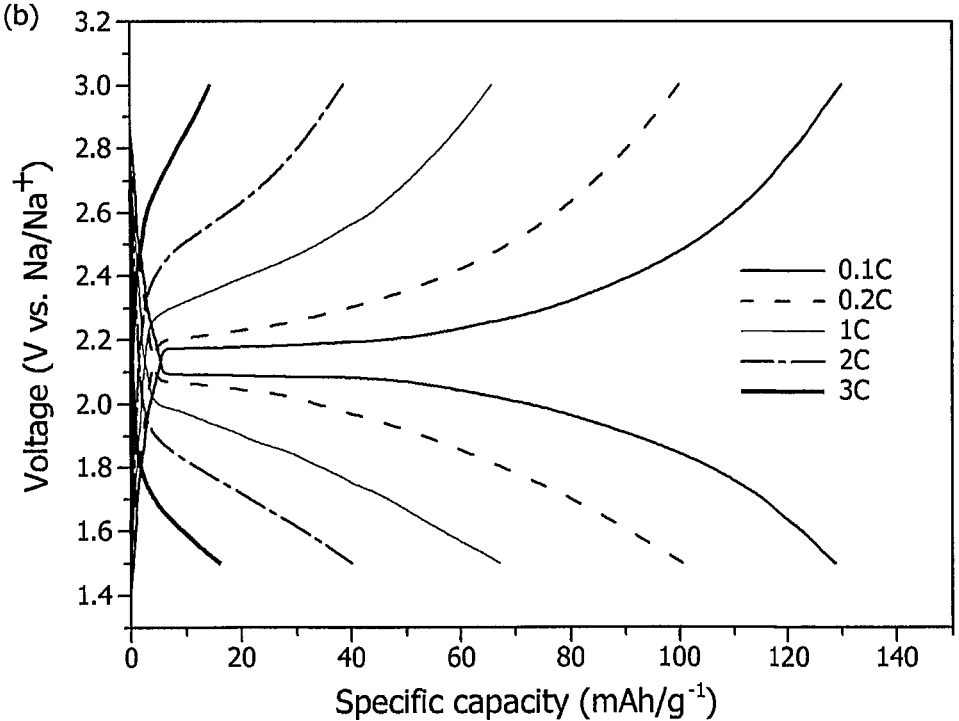

[Fig. 7]
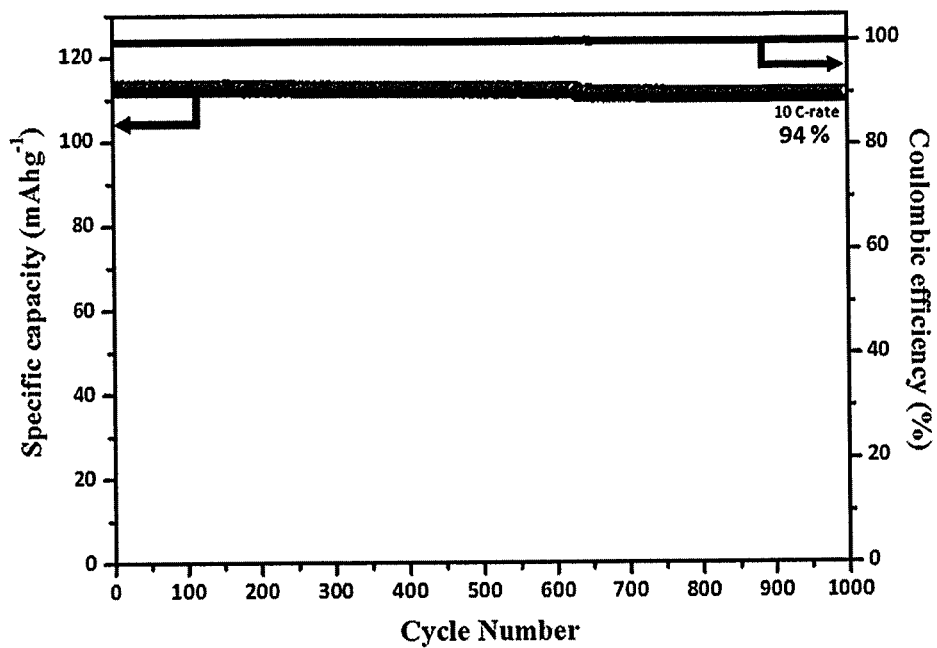

NEGATIVE ACTIVE MATERIAL FOR SODIUM SECONDARY BATTERY, METHOD FOR PREPARING THEREOF AND SODIUM SECONDARY BATTERY USING THE SAME

TECHNICAL FIELD

The present invention relates to a negative active material for a sodium secondary battery having a structure that $NaTi_2(PO_4)_3$ is homogeneously formed in the form of particles on graphenes, a method for preparing thereof and a sodium secondary battery using the same.

BACKGROUND ART

The secondary battery is composed of a negative electrode, a positive electrode, an electrolyte and a current collector. A reduction reaction by electrons generated from the negative electrode occurs in the positive electrode, and the current collector serves to supply a positive active material with electrons generated from the negative electrode on discharging the battery or supply a negative active material with electrons supplied from the positive electrode on charging the battery.

As the sodium secondary battery uses sodium rich on earth, it has an excellent competitiveness in terms of a material supply-demand property and a manufacturing cost and an advantage to be capable of making high capacity battery with a simple structure compared to a lithium ion battery.

Moreover, in order to manufacture a sodium secondary battery having an excellent charge and discharge capacity, a material having high electrical conductivity has to be used as an electrode material. However, since $NaTi_2(PO_4)_3$ being used as a negative active material of the conventional sodium electrode has a low electrical conductivity to be not smooth supply of electrons, which acts as a factor to inhibit the electrode efficiency. Therefore, it is urgently required to develop a technique for enhancing the electrical conductivity of the negative active material.

PRIOR ART DOCUMENT

Patent Document

KR Laid-Open Patent Publication No. 10-2014-0073720
KR Laid-Open Patent Publication No. 10-2015-0099959

DISCLOSURE

Technical Problem

The present invention relates to a negative active material for a sodium secondary battery having $NaTi_2(PO_4)_3$ homogeneously dispersed on graphenes, a method for preparing thereof and a sodium secondary battery using the same, and is intended to provide the negative active material for a sodium secondary battery that represents an excellent electrochemical property and the process of preparation is simple and economical.

Technical Solution

The present invention provides a negative active material for a sodium secondary battery comprising
graphenes; and metal phosphate particles dispersed on graphene surfaces, and satisfying Formula 1 below:

$$A/B \geq 0.8 \qquad \text{[Formula 1]}$$

wherein, A represents the number of metal phosphate particles having a particle diameter of 10 to 40 nm, and B represents the total number of metal phosphate particles.

In addition, the present invention provides a method for preparing a negative active material for a sodium secondary battery comprising
a step of applying a microwave to a mixed solution of a graphite oxide-dispersed polyol solution, a metal or a precursor of said metal, and a phosphate; and
a step of heat treating the mixed solution applied by the microwave.

Furthermore, the present invention provides a sodium secondary battery comprising the negative active material for a sodium secondary battery according to the present invention.

Effects of Invention

The negative active material for a sodium secondary battery according to the present invention has a structure that a metal phosphate is homogeneously dispersed on graphenes in one-step method by using a microwave application method. Therefore, the negative active material for a sodium secondary battery according to the present invention has a metal phosphate with a uniform size to exhibit a high capacity characteristic, and the production process is simple and economical.

BRIEF DESCRIPTION OF DRAWINGS

FIG. 1 is a field emission transmission electron microscope (FE-TEM) photograph of the negative active material according to Example 1.

FIG. 2 is an X-ray diffraction (XRD) graph of the negative active material according to Example 1.

FIG. 3 is a graph showing an X-ray photoelectron spectroscopy (XPS) analysis result, O 1s orbital peak, of the negative active material according to Example 1: wherein, (a) is a graph of the Na—Ti—PO/rGO precursor, and (b) is a graph of $NaTi_2(PO_4)_3$/rGO.

FIG. 4 is a graph showing an X-ray photoelectron spectroscopy (XPS) analysis result, C 1s orbital peak, of the negative active material according to Example 1: wherein, (a) is a graph of the Na—Ti—PO/rGO precursor, and (b) is a graph of $NaTi_2(PO_4)_3$/rGO.

FIG. 5 is a graph showing an X-ray photoelectron spectroscopy (XPS) analysis result, Ti 2p orbital peak, of the negative active material according to Example 1: wherein, (a) is a graph of the Na—Ti—PO/rGO precursor, (b) is a graph of $NaTi_2(PO_4)_3$/rGO.

FIG. 6 represents an experimental result of charge and discharge of the negative active material according to Example 1 and Comparative Example 2.

FIG. 7 is a lifetime characteristic result of the negative active material according to Example 1.

DETAILED DESCRIPTION FOR CARRYING OUT INVENTION

The present invention is directed to a negative active material for a sodium secondary battery, a method for preparing thereof and a sodium secondary battery using the same.

It is a main technical challenge of the present invention to improve a problem to inhibit the electrode efficiency, since electrons are not smoothly supplied due to a low electrical conductivity of $NaTi_2(PO_4)_3$ used as a negative active material of the conventional sodium electrode.

Specifically, graphenes and metal phosphate particles are not physically mixed, but form chemical bonds (Ti—O—C bonding), so that the present invention may provide a negative active material for a sodium secondary battery having improved electrochemical properties.

The negative active material for a sodium secondary battery according to the present invention comprises graphenes; and metal phosphate particles which are dispersed on graphene surfaces, and satisfies Formula 1 below:

$$A/B \geq 0.8 \quad \text{[Formula 1]}$$

wherein, A represents the number of metal phosphate particles having a particle diameter of 10 to 40 nm, and B represents the total number of metal phosphate particles.

The average particle diameter of the metal phosphate particles is 10 to 40 nm. Specifically, the metal phosphate particles may have an average particle diameter in the range of 10 to 45 nm, 10 and 35 nm, 15 to 35 nm, 15 to 30 nm or 20 to 30 nm.

In addition, the metal phosphate particles have an A/B value of 0.8 or more and represent the size of a uniform particle diameter. Specifically, the metal phosphate particles may have an A/B value in the range of 0.75 or more, 0.78 or more, 0.83 or more, 0.85 or more, 0.88 or 0.9 or more. The negative active material for a sodium secondary battery according to the present invention has a low average particle diameter of the metal phosphate particles to shorten diffusion distances of reactive species in the solid phase and to increase a reaction system area, so that it may have an advantage to be capable of improving electrochemical utilization.

The metal phosphate particles may contain at least one metal selected from the group consisting of Na, Ti, Fe, V, Co, Ru and Mn.

For example, the metal phosphate particles may contain two or more metals selected from the group consisting of Na, Ti, Fe, V, Co, Ru and Mn. Specifically, the metal phosphate particles may contain Na and Ti metals. More specifically, the metal phosphate particles may include $NaTi_2(PO_4)_3$.

In addition, the content of the metal phosphate particles may be in the range of 80 to 95 parts by weight, 80 to 92 parts by weight, 83 to 92 parts by weight, 85 to 92 parts by weight or 85 to 90 parts by weight, based on 100 parts by weight of graphenes. Specifically, the content of the metal phosphate particles may be in the range of 80 to 95 parts by weight or 85 to 90 parts by weight, based on 100 parts by weight of graphenes.

At this time, the graphene may be the reduced graphene oxide.

In addition, in one example, the present invention provides a method for preparing a negative active material for a sodium secondary battery comprising a step of applying a microwave to a mixed solution of a graphite oxide-dispersed polyol solution, a metal or a precursor of the metal, and a phosphate; and a step of heat treating the mixed solution applied by the microwave.

The graphite oxide-dispersed polyol solution may be prepared by applying an ultrasonic wave to a mixed solution of a graphite oxide powder and a polyol solvent so that the graphite oxide is dispersed in the polyol solvent.

The polyol solvent may be one or more selected from the group consisting of ethylene glycol (EG), diethylene glycol (DEG), triethylene glycol (TEG) and tetraethylene glycol (TTEG).

The metal or the precursor of the metal includes at least one metal selected from the group consisting of Ni, Fe, V, Co, Ru and Mn. Specifically, it may be a metal or a precursor of the metal, including Ti. Examples of the metal precursor may include titanium ethoxide, titanium methoxide, and the like.

The phosphate may include an alkali metal phosphate. Specifically, it may include sodium phosphate, lithium phosphate or potassium phosphate. For example, it may be monosodium phosphate.

The mixed solution may further comprise ammonium phosphate. Specifically, it may include monobasic ammonium phosphate or dibasic ammonium phosphate.

The step of applying the microwave is carried out for 30 minutes or more at 100 to 300° C. with 2.5 to 60 GHz. The temperature in the step of applying the microwaves may be 120 to 280° C., 150 to 250° C. or 180 to 230° C. The frequency of the microwave may be 5 to 60 GHz, 10 to 55 GHz, 15 to 50 GHz or 20 to 45 GHz. The time of applying this microwave may be 20 to 120 minutes, 30 to 120 minutes, or 30 to 100 minutes. Through the above conditions, the Ti—P—O—Na/graphene precursor is produced.

Since the Na—Ti—P—O/graphene precursor generated through the step of applying the microwave is not physically bonded, but chemically bonded, it may have a bonding structure of the Na—Ti—P—O—C form. By having the chemical bonding as above, the electrical conductivity of the negative active material may be improved.

The step of heat treating can be carried out under an inert gas atmosphere by applying heat at 600 to 900° C. Specifically, the inert gas may include argon (Ar), neon (Ne) or helium (He). In addition, the heat treatment temperature may be 630 to 900° C., 650 to 870° C., 680 to 850° C. or 700 to 850° C. The basic invention can convert Ti—P—O—Na/graphene precursors to $NaTi_2(PO_4)_3$/graphenes by carrying out the step of heat treating in the above temperature range. In the $NaTi_2(PO_4)_3$/graphenes prepared as such C—C bonings inside the graphenes increase, so that the electrical conductivity can be improved.

The method for preparing a negative active material for a sodium secondary battery according to the present invention may further, after applying the microwave and prior to heat treating, a step of washing the solution applied by the microwave with a solvent and drying it by a freeze dryer.

The solvent which washes the solution applied by the microwave may comprise one or more selected from the group consisting of distilled water, ethanol, acetone and acetic acid.

In the step of drying by the freeze dryer, the drying time is 24 hours or more. Specifically, the drying time may be 25 hours or more, 24 to 36 hours or 24 to 48 hours.

In addition, in one example, the present invention provides a sodium secondary battery comprising the negative active material for a sodium secondary battery according to the present invention.

The sodium secondary battery may be composed of a negative electrode, a positive electrode, an electrolyte and a current collector. For example, it may be composed of an electrode coated on a copper current collector with 2 to 3 mg of a negative active material; a reference electrode and a counter electrode, using sodium metal; and an electrolyte comprising an organic solvent and a sodium salt.

The sodium secondary battery according to the present invention may satisfy, in a charge-discharge experiment, Formula 2 below:

$$X \geq 85 mAh/g \quad \text{[Formula 2]}$$

wherein, X represents a charge-discharge capacity on charging and discharging 50 C in a condition using an electrode coated on a copper current collector with 2 to 3 mg of a negative active material.

In one example, the charge-discharge capacity (X) of the sodium secondary battery according to the present invention may be 85 mAh/g or more, 87 mAh/g or more, 90 mAh/g or 90 mAh/g to 120 mAh/g. Specifically, the charge-discharge capacity (X) may be 90 mAh/g or 90 mAh/g to 120 mAh/g.

The sodium secondary battery according to the present invention comprises the negative active material which has not only a low average particle diameter as 10 to 40 nm to shorten diffusion distances of reactive species in the solid phase and to increase a reaction system area, but also comprises graphenes to increase C—C bonding and to improve the electrochemical properties, and thus has an excellent charge and discharge capacity and discharge retention. For example, when the charge and discharge rate is 0.1 C, the charge-discharge capacity has 133 mAh/g. In addition, it can be seen through the above experiment that even in the severe condition that the charge and discharge rate is 50 C, it has a charge-discharge capacity of 85 mAh/g or more.

Hereinafter the present invention is explained in more detail through examples according to the present invention, but the scope of the present invention is not limited by the examples set forth below.

The present invention may be better understood by the following examples, which are for illustration of the present invention and not intended to restrict the scope of protection defined by the appended claims.

PREPARATION EXAMPLE 1

In a step of preparing graphite oxide through the Modified Hummer method, sulfuric acid ($H_2SO_4$) and potassium permanganate ($KMnO_4$) were mixed and stirred at room temperature for at least 2 hours, using graphite as a precursor, and then when the color of the solution turned yellow, hydrogen peroxide ($H_2O_2$) was added to the solution to complete the reaction. After completion, the centrifugation was carried out, followed by a drying process, to obtain graphite oxide in a fine powder form.

EXAMPLE 1

0.1 g of graphite oxide powder in Preparation Example 1 was ultrasonically treated in 100 mL of ethylene glycol (DEG,>99%, Aldrich) for 30 minutes, and 0.42 mL of titanium ethoxide [$Ti(OCH_2CH_3)_4$] (Aldrich) was added to the solution. The mixed solution was divided by 40 mL and loaded on two 100 mL-Teflon vessels, and 6 mL of 0.1 M monosodium phosphate ($NaH_2PO_4$) and 3 mL of 0.2 M monobasic ammonium phosphate ($NH_4H_2PO_4$) were added to each vessel, mixed and then stirred. The microwave with a frequency of 30 GHz was applied to the mixed solution in the condition of 200° C. for 30 minutes by a microwave synthesizer (microwave digestion system) [MARS-5, CEM Corporation]. After completion of the reaction, the Na—Ti—P—O/graphene precursor was repeatedly washed with distilled water and ethanol and dried for 24 hours by a freeze dryer.

Finally, the negative active material in the final $NaTi_2(PO_4)_3$/graphene form was prepared by heat treating the Na—Ti—P—O/graphene precursor in an inert (Ar) atmosphere at 800° C. for 10 hours. At this time, the average particle diameter of the prepared negative active material was 20 to 30 nm, the average particle diameter of which was 10 to 40 nm was found to be about 85%, and the result was shown in Table 1 below.

EXAMPLE 2

The negative active material was prepared in the same manner as Example 1 above except that a microwave of 40 GHz was applied for 30 minutes. At this time, the average particle diameter of the prepared negative active material was 25 to 35 nm, the average particle diameter of which was 10 to 40 nm was found to be about 83%, and the result was shown in Table 1 below.

EXAMPLE 3

The negative active material was prepared in the same manner as Example 1 above except that the temperature on applying the microwave was 250° C. At this time, the average particle diameter of the prepared negative active material was 28 to 40 nm, the average particle diameter of which was 10 to 40 nm was found to be about 80%, and the result was shown in Table 1 below.

COMPARATIVE EXAMPLE 1

The negative active material was prepared in the same manner as Example 1 above except that $NaTi_2(PO_4)_3$ was used instead of the $NaTi_2(PO_4)_3$/graphene negative active material. At this time, the average particle size of the prepared negative active material was 100 to 128 nm, the average particle diameter of which was 10 to 40 nm was found to be about 8%, and the result was shown in Table 1 below.

COMPARATIVE EXAMPLE 2

The negative active material was prepared in the same manner as Example 1 above except for omitting the step of applying the microwave (a state that graphene and $NaTi_2(PO_4)_3$ were physically mixed). At this time, the average particle size of the prepared negative active material was 40 to 65 nm, the average particle diameter of which was 10 to 40 nm was found to be about 33%, and the result was shown in Table 1 below.

TABLE 1

| entry | Average Diameter [nm] | A/B * 100 |
| --- | --- | --- |
| Example 1 | 20-30 | 85 |
| Example 2 | 25-35 | 83 |
| Example 3 | 28-40 | 80 |
| Comparative Example 1 | 100-128 | 8 |
| Comparative Example 2 | 40-65 | 33 |

EXPERIMENTAL EXAMPLE 1

In order to confirm the shape of the negative active material according to the present invention, the field emission transmission electron microscope (FE-TEM) was performed to take photos for the negative active material prepared in Example 1, the measured results were shown in FIG. 1.

As shown in FIG. 1, it can be seen that the negative active material according to the invention has a form fixed on graphene surfaces by the metal phosphate particles of about 10 to 40 nm. Also, since the interplanar distance of $NaTi_2(PO_4)_3$ is 0.436 nm, it can be confirmed that the crystal was well formed.

EXPERIMENTAL EXAMPLE 2

In order to confirm the component contents of the negative active material according to the present invention, the X-ray diffraction (XRD) was measured for the negative active material prepared in Example 1 and the Na—Ti—PO/rGO precursor in a state after applying the microwave, and the measured results were shown in FIG. 2.

Referring to FIG. 2, in the negative active material prepared in Example 1, it could be confirmed that since the same peak as $NaTi_2(PO_4)_3$ was ascertainable, $NaTi_2(PO_4)_3$ is present. On the other hand, in Na—Ti—P—O/rGO precursor the peak of $NaTi_2(PO_4)_3$ could not be confirmed.

EXPERIMENTAL EXAMPLE 3

In order to confirm the bonding properties among the components constituting the negative active material according to the present invention, the X-ray photoelectron spectroscopy (XPS) was measured for the negative active material prepared in Example 1 (after heat treatment) and the Na—Ti—PO/rGO precursor in a state after applying the microwave (before heat treatment), and the results were shown in FIG. 3 to FIG. 5.

FIG. 3 is O 1s orbital peak graphs of XPS results in the Na—Ti—PO/rGO precursor (before heat treatment) and the negative active material prepared in Example 1 (after heat treatment). Referring to FIG. 3, it can be confirmed that in all the states of the Na—Ti—PO/rGO precursor in a state of a step before heat treatment after applying the microwave and $NaTi_2(PO_4)_3$/rGO composite, the Ti—O—C bond in O 1s peaks is formed. This means that the bonding between graphene and metal phosphate forms chemical bonding other than a simple physical mixing.

Also, FIG. 4 is C is orbital peak graphs of XPS results in the Na—Ti—PO/rGO precursor (before heat treatment) and the negative active material prepared in Example 1 (after heat treatment). Referring to FIG. 4, the C—C orbital can be confirmed at 284.6 eV, and the C—O, C=O and O—C=O functional groups on the surfaces can be confirmed at 286.1 eV, 287.0 eV and 288.4 eV. In addition, in the case of the negative active material prepared in Example 1, it can be confirmed that the C—C peak was increased, which means that the electrochemical properties were improved. Furthermore, seeing that the C—O bonding decreases, as the complexation is performed in the graphene oxide state having many oxygen functional groups, it can be seen that graphene oxide is reduced by bonding metal phosphate through the oxygen functional groups on the surfaces.

In addition, FIG. 5 is Ti 2p orbital peak data of XPS results in the Na—Ti—PO/rGO precursor (before heat treatment) and the negative active material prepared in Example 1 (after heat treatment). Referring to FIG. 5, it was confirmed that no movement change of Ti peak was before and after the heat treatment. Through this, it can be seen that even after high temperature heat treatment, the $Ti^{4+}$ ion forms a bond with carbon on the graphene without change.

EXPERIMENTAL EXAMPLE 4

In order to analyze the electrochemical characteristics of the negative electrode active material according to the present invention, example 1 and using as a negative electrode active material of sodium ion cell material produced in Comparative Example 2, the inverted paper (half-cell) charging the electrode at the discharging capacitor It was evaluated in the evaluation and discharge retention.

Example 1 and as a negative electrode active material and 90 parts by weight of the binder prepared in Comparative Example 2, polyvinylidene fluoride (Polyvinylidene fluoride, PVDF) mixed 10 parts by weight, N-methyl-2-pyrrolidone (N-methyl-2-pyrrolidone, NMP) were prepared and added to the electrode slurry, which was prepared by 2~3 mg copper coating and drying on a current collector electrode. Of sodium metal it was used as a reference electrode and a counter electrode, an electrolyte of ethylene carbonate (EC) and dimethyl carbonate (DMC) 1:1 was set to M sodium perchlorate (NaClO4) was dissolved in a solution mixed in the ratio 1. Charge-discharge experiments were carried out by using a potential toilet/electrostatic current method (potentiostat/galvanostat, VMP2, Princeton Applied Research). Voltage range was 1.5 to ~3.0 V, the charge and discharge rate was measured while changing from 0.1 C up to 50 C, shown in FIG. 6 the results.

In addition, was the negative electrode active material for sodium ion tests for the charge and discharge speed to 10 C to the battery electrode material produced using a repeated 1,000 times in Example 1, it is shown in FIG. 7 for the result.

The FIG. 6 (a) to look at, as a graph representing the capacity of the electrode containing the negative electrode active material per unit weight of the electrode prepared in Example 1, when the charging and discharging speed is 0.1 C, the charge and discharge capacity is 133 mAh/g. This is the same as the value of the theoretical capacity 133 mAh/g it shows that the excellent charge-discharge capacity. In addition, about 110 mAh/g capacity of the reverse charge when the charge-discharge rate is 10 C. Moreover, since the charge and discharge speed is indicated approximately 85 mAh/g in the charge-discharge capacity value of the 50 C heavy conditions can be found that the excellent charge-discharge capacity.

On the other hand, FIG. 6 (b) is a graph showing the capacity of the electrode comprising the cathode active material prepared in Example 2 compared per unit weight of the electrode, the graphene and NaTi2 (PO4) reduction of Comparative Example 2 3 The mixture (mixture) it is simply combined physically without chemical bonding. Electrode including a negative active material of Comparative Example 2 are charged at different current densities • to check that the discharge rate characteristics are different significantly less with the electrode comprising a NaTi2 (PO4) 3/rGO complex of Example 1, which graphene the excellent charge-chemical bonding between the metal phosphate • can be seen that the contribution to the discharge rate characteristics.

In addition, to FIG. 7, an example is graph showing a retention rate of the discharge electrode including a negative active material in 1, even after 1000 cycles can confirm the excellent discharge capacity retention rate of 95% compared to the initial discharge rate at 10 C.

The invention claimed is:
1. A sodium secondary battery comprising:
a negative active material containing
reduced graphene oxide, and
metal phosphate particles dispersed on a surface of the reduced graphene oxide,
the metal phosphate particles satisfying Formula 1 below

$$A/B \geq 0.8 \quad \text{[Formula 1]}$$

wherein, A represents the number of metal phosphate particles having a particle diameter of 10 to 40 nm, and B represents the total number of metal phosphate particles, and
the sodium secondary battery satisfying Formula 2 below in a charge-discharge test $$X \geq 85 mAh/g \quad \text{[Formula 2]}$$

wherein, X represents a charge-discharge capacity on charging and discharging 50 C in a condition using an electrode coated on a copper current collector with 2 to 3 mg of a negative active material.

2. The sodium secondary battery according to claim 1, wherein said metal phosphate particles contain two or more metals selected from the group consisting of Na, Ti, Fe, V, Co, Ru and Mn.

3. The sodium secondary battery according to claim 1, wherein the content of said metal phosphate particles is 80 to 95 parts by weight based on 100 parts by weight of graphenes.

* * * * *